United States Patent [19]

Arai

[11] Patent Number: 4,618,253

[45] Date of Patent: Oct. 21, 1986

[54] FOCAL POSITION ADJUSTING DEVICE FOR SMALL VARIABLE-MAGNIFICATION TYPE COPYING MACHINE WITH ZOOM LENS

[75] Inventor: Yasunori Arai, Tokyo, Japan

[73] Assignee: Asahi Kogaku Kogyo K.K., Tokyo, Japan

[21] Appl. No.: 716,433

[22] Filed: Mar. 27, 1985

[30] Foreign Application Priority Data

Apr. 16, 1984 [JP] Japan .................................. 59-76386

[51] Int. Cl.[4] ...................... G03B 27/34; G03B 27/40; G03B 27/70

[52] U.S. Cl. .......................................... 355/57; 355/60

[58] Field of Search .................... 355/8, 11, 57, 60, 66, 355/55

[56] References Cited

U.S. PATENT DOCUMENTS 3,865,482 2/1975 Bendall et al. .................... 355/57 X
4,322,159 3/1982 Takahashi et al. .................... 355/57
4,420,248 12/1983 Ogawa et al. ......................... 355/57
4,555,165 11/1985 Negoro ............................ 355/55 X
4,557,593 12/1985 Iwanade ............................... 355/57

*Primary Examiner*—Richard A. Wintercorn
*Attorney, Agent, or Firm*—Sughrue, Mion, Zinn, Macpeak & Seas

[57] ABSTRACT

A focal position adjusting device for a small variable-magnification type copying machine having a zoom lens. First and second mirrors are arranged below an original holding stand, the first mirror reflecting the image of an original on the holding stand, and the second mirror reflecting the image from the first mirror towards a photosensitive drum. A zoom lens is disposed between the first and second mirrors. The zoom lens includes at least two lens groups arranged along the optical axis. The positions of these two lens groups are adjusted during the assembly of the copying machine so that the focal position falls on the surface of the original for various magnification settings.

4 Claims, 4 Drawing Figures

FOCAL POSITION ADJUSTING DEVICE FOR SMALL VARIABLE-MAGNIFICATION TYPE COPYING MACHINE WITH ZOOM LENS

BACKGROUND OF THE INVENTION

The present invention relates to a small variable-magnification type copying machine employing a zoom lens for magnification variation. More particularly, the invention relates to a device for adjusting the focal position of the zoom lens during assembly.

Recently, copying machines have been separately miniaturized and given a magnification varying function. However, no fully acceptable small variable-magnification type copying machine has heretofore been known. A copying machine employing a fiber lens array may satisfy the requirement for miniaturization; however, it is difficult to provide it with a magnification varying function. On the other hand, it is difficult to miniaturize and simplify the construction of a conventional copying machine with a magnification varying optical system using a fixed focus lens due to the requirement for a mechanism for correcting for the distance between the object and image during magnification variation.

FIG. 1 shows the arrangement of a small variable-magnification type copying machine using the aforementioned fixed focus lens. In this system, in order to miniaturize the system, an original holding stand 11 made of a glass plate is designed so as to be movable parallel to the plane of its surface on which an original O is placed. As the original holding stand 11 is moved, the original O on the stand 11 is illuminated by an illuminating lamp unit 12, as a result of which the slit image of the original O is formed on a photosensitive drum 17 by means of mirrors 13, 14*a* and 14*b*, a fixed focus lens 15, and a mirror 16.

In the copying machine, magnification is varied according to a method in which the fixed focus lens 15 is moved to a position corresponding to a desired magnification (as indicated by broken lines in FIG. 1), and the mirrors 14*a* and 14*b* are moved to positions (also indicated by broken lines) in association with the variation of the distance between the object and image due to the movement of the fixed focus lens 15.

The movement control mechanism needed for moving the fixed focus lens 15 and the mirrors 14*a* and 14*b* in the above-described manner is unavoidably intricate in construction, which limits the miniaturization of the copying machine.

On the other hand, a variable magnification type copying machine employing a zoom lens system can be made simple in construction because the distance between the object and image can be maintained constant due to the use of the zoom lens. An example of such a copying machine, as shown in FIG. 2, includes mirrors 18 and 19 provided below an original holding stand 11. The mirror 18 operates to reflect the slit image of an original O illuminated by an illuminating lamp unit 12 along a path parallel to the plane of the stand 11. The mirror 19 is used to reflect the slit image towards a photosensitive drum 17. The zoom lens 20 is provided between the mirrors 18 and 19.

In the above-described arrangement, the distance between the object and image can be maintained constant by changing the focal length of the zoom lens 20. Therefore, the mirrors 18 and 19 may be fixed in position. In addition, in the arrangement shown in FIG. 2, the original holding stand 11 is movable. Accordingly, the copying machine can be made small in size and it has a magnification varying function.

Even in this copying machine, however, the zoom lens 20 inevitably has manufacturing errors, and accordingly adjustment must be performed to correctly make the focal point coincide with the upper surface of the original holding stand 11, namely, the surface of the original, irrespective of the given copying magnification. This adjustment is carried out using the following two steps:

It is assumed that the copying machine has several magnifications. The position, of the whole zoom lens 20, and the position, in the direction of the optical axis, of one of the lens groups forming the zoom lens 20, are adjusted so that, when the focal length of the zoom lens is changed for the different magnifications, the focal positions are the same (or within the allowable depth of focus). If the focal position coincides with the upper surface of the original holding stand 11 (or the original's surface), then no further adjustment is needed. However, since the zoom lens 20 may have manufacturing errors as described above, in general, it is difficult to coincide the focal position with the upper surface of the original holding stand 11 by such a simple adjustment. It is now assumed that, as a result of the previous adjustment, the focal positions for the different magnifications are at the point A near the original holding stand 11. Under this condition, the mirror 18 is moved to adjust the optical path length so that the point A falls on the upper surface of the original holding stand 11. At this time, for all magnifications, the zoom lens 20 can be correctly focused on the original's surface.

However, the above-described adjustment performed in two steps cannot meet the requirements for simplifying the construction and assembly of the copying machine and miniaturizing the latter because it is intricate and requires a mechanism for adjusting the position of the mirror 18. Furthermore, the movement of the mirror 18 results in another difficulty that the original reading position is changed with movement of the mirror 18.

SUMMARY OF THE INVENTION

Accordingly, an object of the invention is to make it possible to readily achieve proper adjustment in assembling a copying machine in which the original holding stand is reciprocated as shown in FIG. 2, and to simplify the mechanism used for the adjustment work. More specifically, an object of the invention is to provide a focal position adjusting device for a small variable-magnification type copying machine in which the difficulty accompanying a conventional small variable-magnification type copying machine that both the zoom lens position and the mirror position must be controlled for the adjustment of focal position is eliminated so that, for a plurality of copying magnifications, the focal positions can be adjusted to fall on the surface of the original by operating the zoom lens only.

In a small variable-magnification type copying machine of the invention, first and second mirrors are arranged below a movable original holding stand and a zoom lens is disposed between the first and second mirrors. According to the invention, the positions, in the direction of the optical axis, of at least two groups in the zoom lens are adjusted so that focal position variation due to lens manufacturing error is corrected and the focal positions for the various copying magnifications are made to coincide with the original's surface. Accordingly, it is unnecessary to adjust the positions of the mirrors, and therefore to provide a mechanism for adjusting the positions of the mirrors. Thus, the small variable-magnification type copying machine provided by the invention is simple in construction.

DESCRIPTION OF THE PREFERRED EMBODIMENTS

The invention will be described with reference to preferred embodiments thereof.

Figure 1:
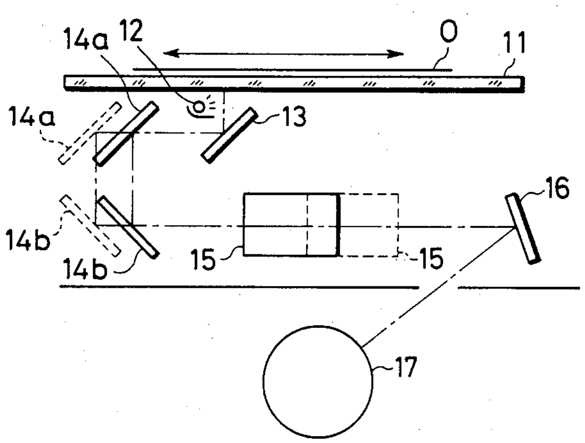
FIG. 1 is an explanatory diagram showing an example of a conventional variable-magnification type copying machine employing a fixed focus lens.
Figure 2:
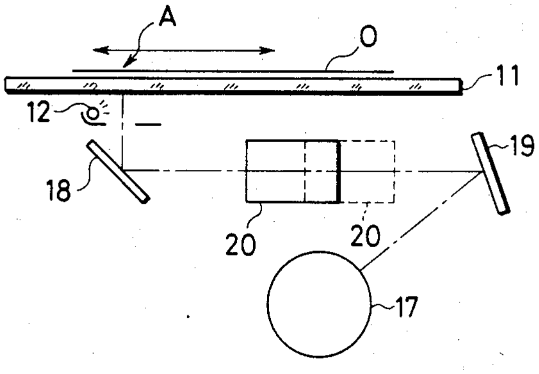
FIG. 2 is an explanatory diagram showing an example of a small variable-magnification type copying machine to which the technical concept of the invention is applicable.
Figure 3:
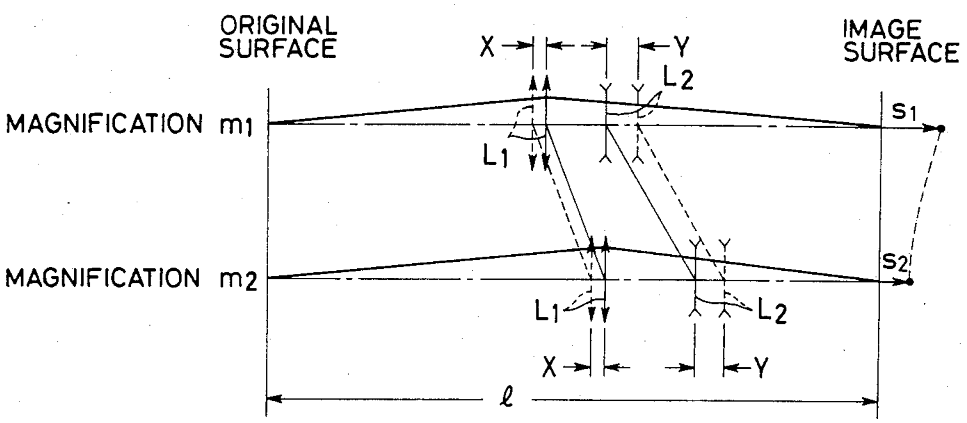
FIG. 3 is an explanatory diagram for a description of the principles of the invention.

FIG. 3 is a diagram illustrating the principles of the invention. In FIG. 3, reference character l designates the distance between the object and its image, that is, the distance between the original's surface O and a photosensitive drum 17; L1, a first movable lens group; and L2, a second movable lens group. The reference positions of the first and second movable lens group L1 and L2 are as indicated by solid lines, but the actual positions thereof, as indicated by broken lines, are spaced from the reference positions due to manufacturing errors.

It is assumed that, with two different magnifications $m_1$ and $m_2$, the image points are shifted by distances $S_1$ and $S_2$, respectively, from the photosensitive surface. If, in this case, the amounts of shift x and y of the image points which occur when the first and second movable lens groups L1 and L2 are moved by respective distances X and Y in the direction of the optical axis are combined, then the image points for the magnifications $m_1$ and $m_2$ can be brought to the photosensitive surface. After this adjustment, the zoom lens system is moved in its entirety while the distance between the first and second movable lens groups L1 and L2 is changed in a predetermined relationship. With this method, the amount of defocusing for a given magnification can be limited to a small value.

In the case of a zoom lens having a plural number N of lens groups, if the positions in the direction of the optical axis of at least K lens groups (where $K \geqq 2$) are made adjustable, then for K magnifications the zoom lens can be correctly focused for the reference positions.

In practice, two or three lens position adjusting points are provided, and the zoom lens is focused at these adjusting points. By this method, the amounts of defocusing among these adjusting points can be limited to sufficiently small values, and the focusing can be corrected sufficiently accurately over the entire range of magnification.

Figure 4:
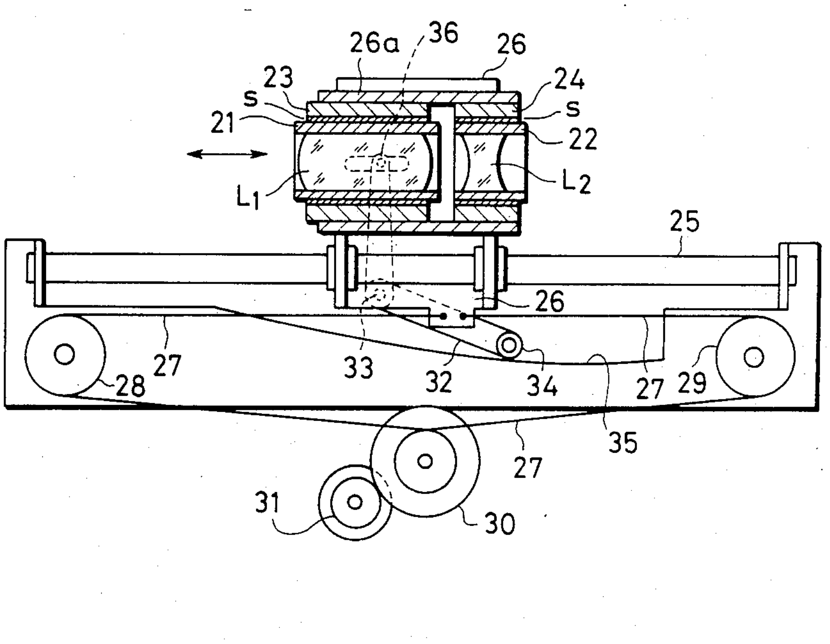
FIG. 4 is a plan view, with essential parts in section, showing an example of a focal position adjusting device according to the invention.

FIG. 4 shows an example of a focal position adjusting device constructed according to the invention. In this device, the zoom lens includes front and rear lens groups, namely, first and second lens groups L1 and L2 which are fixedly held by lens frames 21 and 22, respectively. The lens frames 21 and 22 are inserted into lens mounts 23 and 24, respectively. More specifically, the lens frames 21 and 22 are threadedly engaged with the lens mounts 23 and 24, respectively, as indicated generally by reference characters S, so that the first and second movable lens groups L1 and L2 can be moved along the optical axis independently of each other.

The lens mount 23 is slidably supported by the lens supporting cylinder **26*a* of the movable stand 26, which can be moved on a guide rod 25. The other lens mount 24 is fixedly secured to the lens supporting cylinder 26*a*. A drive wire 27 connected to the movable stand 26 is laid over pulleys 28, 29 and 30 and driven by a control motor 31. A cam lever 32 is pivotally mounted on a shaft 33 provided on the movable stand 26. A cam follower 34 provided at one end of the cam lever 32 is in contact with a cam 35, and the other end of the cam lever 32 is pivotally mounted on the lens mount 23**.

When the control motor 31 rotates, the first and second movable lens groups L1 and L2 are moved, as a unit, along the optical axis, and the distance between the first and second movable lens groups L1 and L2 is changed according to the configuration of the cam 3, thus changing the focal length.

I claim:

1. A small zoom-lens operated variable-magnification type copying machine comprising: a reciprocating original holding stand; a first mirror for reflecting the image of an original on said stand; an second mirror for reflecting towards a photosensitive drum a light beam reflected from said first mirror, said first and second mirrors being arranged below said original holding stand; and a zoom lens disposed between said first and second mirrors, said zoom lens including at least two lens groups arranged along the optical axis; zooming means for moving said zoom lens to perform a zooming operation and position adjusting means for adjusting the positions, in the direction of the optical axis, of said at least two lens groups in said zoom lens during assembly of said copying machine independently of said zooming operation.

2. The device as claimed in claim 1, wherein said position adjusting means comprises means for adjusting positions of all lens groups in said zoom lens.

3. The device as claimed in claim 1, wherein said copying machine further comprises lens frames for each of said at least two lens groups, lens mounts for holding each of said lens frames, and said position adjusting means comprises means for threadedly engaging said lens frames with said lens mounts.

4. A method of adjusting the focal position in a variable magnification copying machine having a zoom lens capable of at least first and second magnifications, said zoom lens having at least first and second lens groups, said method comprising the steps of:

calculating an adjustment amount of said first and second lens groups necessary to achieve a desired focal position at said first magnification;

calculating an adjustment amount of said first and second lens groups necessary to achieve a desired focal position at said second magnification;

determining, in accordance with said first and second calculations, an adjustment amount for each of said first and second lens groups which will substantially achieve said desired focal positions at both said first and second magnifications; and adjusting said first and second lens groups by said determined amounts.

* * * * *